July 23, 1968  J. F. MARCHAND  3,394,072
MULTIPLE CHAMBER DESALINATOR
Filed Sept. 17, 1964
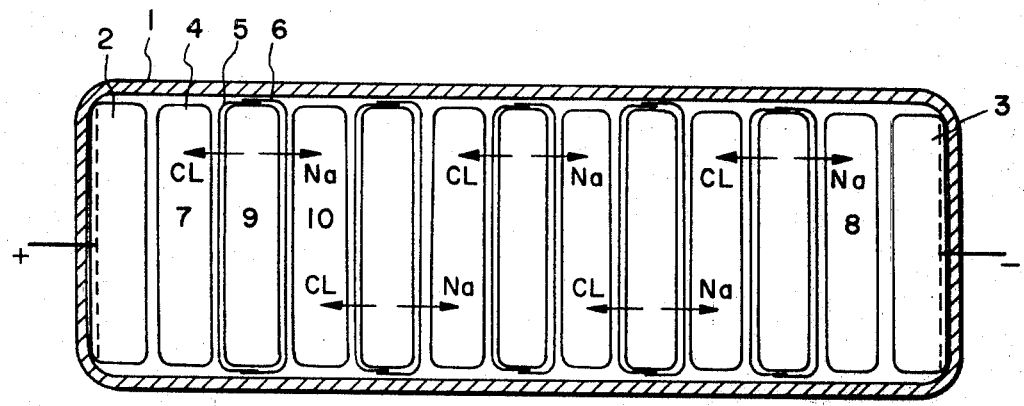
FIG. I
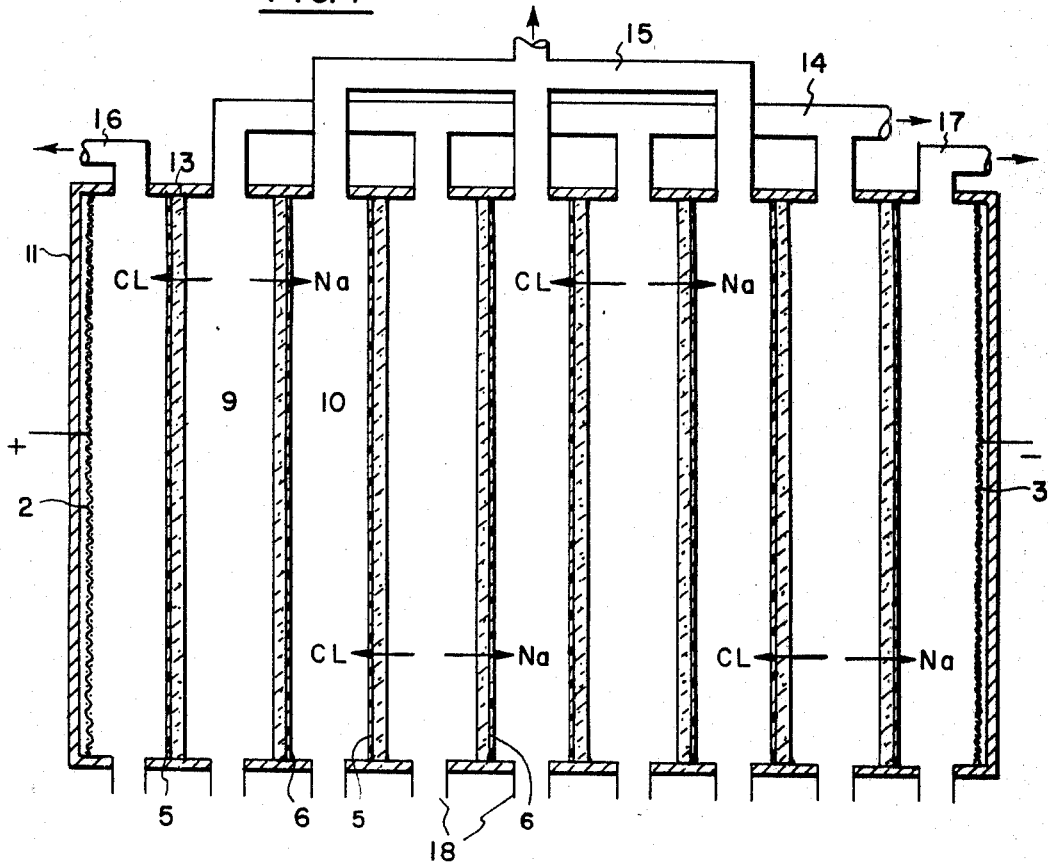
FIG. 2
INVENTOR
JOHN F. MARCHAND
BY
*Robert ...*
ATTORNEY

3,394,072
MULTIPLE CHAMBER DESALINATOR
John F. Marchand, 445 E. 65th St.,
New York, N.Y. 10021
Filed Sept. 17, 1964, Ser. No. 397,230
3 Claims. (Cl. 204—301)

ABSTRACT OF THE DISCLOSURE

An apparatus for the electrodialysis of salt and brackish waters and similar purposes is described in which tubes or ducts of permeable material support on one side non-self supporting cation permeable material and on the other side an ion permeable material, the tubes are mounted next to each other with cation permeable walls and anion permeable walls alternating. Salt water flows through and electrodes are present at each end causing flow of ions from alternate tubes to produce relatively fresh water and more concentrated salt water. There are two modifications in one of which the tubes are flexible and can even be coiled into compact spaces and in the other modification where the chambers or ducts produced are strong and rigid.

Background of the invention

The problem of recovery of fresh or relatively fresh water from brackish waters or ocean water has long been a serious one. In the past there have been a number of installations using multiple effect evaporation. However the fuel costs have been high, except in certain areas such as those along the Persian Gulf where locally fuel oil is extremely cheap. As a result distillation has been a useful method only for critically needed installations which can bear the high costs, for example a dollar or more per thousand gallons. Distillation methods also present another economic problem, in that the cost is only slightly lower for brackish water as compared with ordinary sea water. The largest part of the cost of a distillation method is the heat required for evaporation of the water, since much of this heat is thrown away in the last effect of the evaporator. A higher salt content merely requires evaporation at somewhat higher temperatures, and thus increases somewhat the heat losses in the process. These additional heating requirements are a small component of the costs compared to those determined by the very high latent heat of vaporization of water, and therefore the heating cost for distillation is not greatly reduced as the content of salt decreases. For practical purposes, and except for special situations such as the small hydroponic agriculture on islands such as Midway Island in the Pacific where some fresh vegetables are grown for food on stopovers of planes, the heating cost of distillation of saline water is prohibitive for any general agricultural uses. Another carefully investigated water purification method is by freezing, but this is also costly because of the equipment and the energy requirement in a temperate climate.

Still another method which has been proposed and one on which a great deal of research work has been done in the last few years, is that involving electrodialysis. The electrodialysis processes are important and potentially very useful ones in which the ions in salt water are separated out by passing an electric current across selectively permeable membranes, that is to say, alternate membranes which pass cations or anions. It is with improved apparatus for an electrodialysis process for saline water reclamation that the present invention deals. An excellent general description of the electrodialysis process is to be found in the article by Eliassen in the June 1954 issue of Civil Engineering, pages 44 to 47.

In the present invention only certain points in the general process will be referred to which are necessary to explain the improvements obtained with the present invention. In general the efficiency of an electrodialysis system increases with the number of membrane pairs and with the surface area of membrane per gallon flow per hour. Multiple membrane pairs even up to 400 or 500 in number in a large press have been practically tested. The power requirement is substantially inversely proportional to membrane area per unit flow but of course the cost of a plant increases with the membrane area which is provided and so a point is eventually reached with each type of water where a minimum cost is obtained.

Contrary to the experience with distillation methods, electrodialysis costs become very much lower as the salinity decreases, and thus electrodialysis is of primary importance with brackish water rather than with ocean water. Of course, where the higher costs of ocean water treatment can be tolerated electrodialysis is also a useable method but it may represent little or no advantage over multiple effect distillation.

The various permselective membranes used for electrodialysis of saline waters are commercially available, and some of the typical membranes of this type are of a sulfonated polystyrene composition for the cation permeable membranes and polystyrene polymers with organic bases for the anion permeable membranes. Among the examples of rigid types there are homogeneous anionic or cationic polystyrene membranes, and these anionic and cationic polystyrene resins are also made up in a flexible form finely subdivided and suspended in an insulating matrix such as polyethylene or polyvinylite for flexible permselective membranes.

Summary of the invention

The present invention does not concern itself with any new chemical constitutions of these various permselective membranes, and typical ones are referred to as examples without of course limiting the invention. Since the present invention is basically one that is not concerned with any particular chemical constitution of selectively permeable membranes it may be used with any suitable permselective membranes that have the right physical characteristics and this includes practically all the known special purpose membranes that are now commercially available.

Similarly the voltage to be used, which of course determines current density if the travel path through a membrane is constant, is affected by the length of the trans membrane pathway, and in this area as will be seen below the present invention effects a very great economy. This economy in the power requirement may be enjoyed either by obtaining the same output of fresh water for a smaller current, or, and this is usually the better compromise, by a greater production for the same or a not greatly increased current. Therefore the present invention is not particularly or critically concerned with the voltages and these voltages can in general be of the same order as have been used before. Needless to say the actual voltage which is applied must be in excess of that which represents the minimum voltage needed in the electrode compartments to cause the ions to give up their charge, and the additional voltage which is applied above this minimum then serves to increase the speed of the electrophoresis. This additional or over voltage is very much greater than that required for electrolysis at the electrodes, but there are also practical limits even in the present invention because a flow of ions through selectively permeable membranes encounters some ohmic resistance, and therefore too high a flow rate can generate heat and set a limit on maximum flow rates of the ions through membranes of a given thickness. As will be seen below, the present invention permits higher flow rates for the ions because thinner selective membranes are used than were possible with the prior art but naturally it also has its limits.

On page 44 of the Eliassen article on electrodialysis the necessary characteristics of the electrodialysis membranes are set out, and the first two which he mentions are of importance in connection with the present invention. These are (a) adequate structural strength and (b) rigidity, for the membranes as used under the prior art must be self supporting or at least when supported along their edges must be strong and rigid enough to resist the pressure differences which occur when there is a rapid flow of water through the apparatus. It is here that the present invention differs strikingly from what was done before. Instead of using structurally strong and rigid membranes which, with any particular material may be quite substantial with respect to membrane thickness, very thin or fragile permselective membranes are used which are not self-supporting, and which in practical sheet sizes, have no rigidity to speak of. Even membranes that are quite flimsy or brittle can be used, and these membranes can be either sprayed on, painted on, or simply preformed and applied over their freely permeable supporting platforms. The special purpose types of selective membranes which are possible in the present invention can actually be very thin and delicate, for example only one or a few millimeters, because they are physically supported by an adjacent permeable structural material either rigid or flexible through which ions or other selected solutes can move with negligible resistance, that is to say a resistance that is negligible compared to the ohmic resistance to the electrophoretic movement of ions through self supporting types of membranes.

Two general types of highly permeable supports are useful, the first being a strong porous material such as a suitable porous ceramic or a fine metallic mesh, and the second being a flexible gel or other permeable and flexible substance which passes ions readily, such as for example a polyvinylite film. This latter type of support material is formed into tubes or conduits and much of the needed physical and mechanical strength and force when the conduits are in proper position is produced by hydraulic pressure within the conduit from the water flowing therethrough. In either case the total resistance to flow of migrating ions or other selected solutes is greatly reduced, and accordingly either the power costs are reduced for the same flow or an increased flow for the same power costs can be enjoyed. The present invention thus permits a marked increase in efficiency in the electrodialysis process. As used in the preferred form of the invention this added supporting material is a tube of very freely and nonselectively permeable material.

There is also an important additional advantage for specialized uses. When the membranes were in the form of more or less fixed walls, as was the case in the prior art the electrodialysis apparatus took the shape of multiple chambers or other cell structures in which the necessary large surface area of the membranes could be provided. Such a construction of large membrane press assemblies does not lend itself well to small installations, such as for example the desalination plant for a small farm or ranch because the old rigid membrane type of structure is expensive for small sizes. The preferred modification of the invention permits these dialysis cell chambers to be the form of parallel tubes or elongate parallel vessel which is sufficiently flexible to be coiled into a fairly small volume, and the construction is also cheaper for these small units in which there is a very real limitation as to the optimum size of the conduits. Therefore in this modification, if large units do become necessary there must be many elongate units in parallel. Even for large installations the modification of the present invention to provide for a structurally strong and highly permeable supporting material sometimes presents savings. It is an advantage of the present invention that it is very versatile as to size or special uses and the modification best adapted for a particular installation may be chosen.

In the modification where hydraulically inflated tubes or other similarly elongate vessels are used as the supporting surfaces there is encountered an additional problem which however is simply solved. It is desirable that the selectively permeable membranes be extended to surround the supporting conduit in order to have a small junction or overlap where the edges of the permselective membranes are welded or otherwise bonded together by well known conventional methods. Electrical leakage around the edges is thus prevented.

Brief description of the drawings

FIG. 1 is a section through the modification in which the supporting structures are hydraulically inflated, and FIG. 2 is a section through the modification using rigid structural supporting material.

Description of the preferred embodiments

In FIG. 1 there is shown an outer water impermeable tube or conduit 1. This contains an anode 2 at one side and a cathode 3 at the other side. In between are flattened chambers formed of polyvinylite tubes 4. On the outside of these tubes there are adjacent cation permeable membranes 5 and anion permeable membranes 6. It will be noted that the membranes extend around the ends of the tubular compartments and overlap slightly at the edges, where they are bonded together to keep ions from wandering around the edges.

FIG. 1 shows only five pairs of selective membranes. The illustration is intended to be diagrammatic and a relatively small number of chambers are shown for clearness. In an actual installation the number of pairs would be very much greater, for example 50 to 100 or more. Brackish water flows through the compartments in one direction, for example into the paper in FIG. 1. The flow of the chloride and sodium ions is shown by arrows and marked Cl and Na. It will be seen that space at the extreme left constitutes an anode compartment 7 and at the extreme right a cathode compartment 8. In between are alternate desalinated water compartments 9 and brine concentrating compartments 10 as in standard electrodialysis practice. Since both types of ions move out of the compartments 9 the salinity in these water compartments decreases, and correspondingly in the brine compartments 10 the salinity increases. If desired there can be a differential flow rate through the two types of compartments, the flow being markedly greater through the brine compartments 10 in order to wash out the brine and decrease the concentration which has an effect in the efficiency of transfer across the semipermeable membranes. This transfer after all is similar to any ordinary diffusion phenomenon and relative concentrations on both sides of the membrane of ions are a factor. This more rapid flushing of the brine compartments, while useful in the present invention is not claimed as such herein.

The nature of the modification of FIG. 1 sets certain limitations on the size of the individual compartments. However, since the outer tube or conduit 1 may be flexible it lends itself to extremely long installations which can be coiled. For example, lengths of up to 100 feet or even more are not impractical. In other words in this modification increased membrane area, which means increased production of fresh water, is best obtained by a great increase in the length of the apparatus. Because such an assembly can be coiled it lends itself to compact small plants for small farms or ranches. Also even in the case of somewhat larger plants, where a large number of conduits are connected in parallel, there is an additional advantage over the more conventional design of electrodialysis apparatus. For example, if there is damage or a malfunctioning in any particular unit of the combination, this unit can be disconnected and repaired separately without in any way affecting the operation of the other units which are in parallel. This kind of repair work of separate units is either not possible or much more difficult, in the fixed installations which have been used before, and this is an additional advantage of the present invention, in the modification shown in FIG. 1.

FIG. 2 illustrates a fixed installation, again in diagrammatic form, with only a few pairs of membranes, in this instance four. The section is along the flow of water, in other words at right angles to the section in FIG. 1. An outer wall or tank 11 houses the dialysis equipment. The same elements are given the same numbers as in FIG. 1. In other words the anode is shown at 2 and the cathode at 3. Compartments are formed of structurally strong permeable material, for example, porous ceramic, metal mesh, and the like. These are indicated at 13 and extend all the way across the tank, forming closed compartments. On either side are very thin selective membranes 5 and 6, which are of the same nature and perform the same functions as in FIG. 1. Again there are alternate compartments 9 and 10, the former representing channels for water which has been desalted and which leaves through a desalted water manifold 14. The compartments 10 have a higher brine concentration just as they do in FIG. 1 and lead to a brine discharge manifold 15. The anode and cathode compartments can discharge chlorinated water and caustic brine through the discharge pipes 16 and 17. As in FIG. 1 brackish water is introduced to all of the compartments through the pipes 18. In order not to confuse the drawings, the migration arrows of the sodium and chloride ions are not shown, but of course the flow is exactly the same as in FIG. 1. The operation of the equipment in FIG. 2 is of course exactly as in FIG. 1 but it does not lend itself as well to small installations and does not have, to the same degree, the advantages of a large number of independent parallel pieces of equipment so arranged that one or another can be cut out of the system for repairs with the same facility.

The equipment has been illustrated in conjunction with the removal of sodium and chloride ions. It should be realized that in sea water or brackish water there are also smaller amounts of other ions such as magnesium, calcium, bromide, sulfate and the like. Needless to say these cations and anions migrate in exactly the same manner as the sodium and chloride ions.

While the present invention is not at all limited to exact structural sizes, in a typical installation the selective membrane thickness may be a fifth to a tenth of the usual normal with respect to thickness, and the supporting structure may have a resistance to ion flow of the order of magnitude of a percent or two or even considerably less than a selectively permeable membrane of the same thickness. In the case of FIG. 1 the membranous supporting tubes will have somewhat greater ohmic resistance per unit area per unit thickness than the porous rigid supports. This is compensated by the ready possibility of an enormous increase in membrane area by very long tubes and also by the other operating advantages, including the possibility of the small installations which have been referred to above.

In the rigid wall modification the permeable solid may be of various forms, porous ceramic walls have advantages and are preferred. Typical other materials, are fritted glass, braided or woven glass fabric, porous polytetrafluoroethylene, porous sintered metals, metal fabrics and the like.

The fragile membranes may be on a side of the supporting structure in the modification of FIG. 2 provided there are no differential pressures from the support to the membrane sufficient to detach it. If there are sufficient differential pressures the membrane may be sandwiched between two supporting walls. In the hydraulic support modification of FIG. 1 the pressure always tends to push the fragile membrane against its supporting conduit.

In the simple diagrammatic illustration in the drawings the fragile permselective membranes are shown as layers, each one being on one side only of the supporting structure. It should be realized that when the supporting structure is porous, such as woven or braided metal mesh or fiber glass or plastic fabric, and the membranes are produced by spraying or painting, they will be on both sides of the supporting structure. However, they will be just as thin and the advantages of thin membranes are obtained in the same manner.

In the modification of FIG. 1 the supporting conduits may be flexible and distensible at all times and for some purposes, particularly when the unit is to be coiled, this presents advantages. However, it is also possible to make the supporting conduit of thermoplastic material which can be hydraulically inflated at a somewhat higher temperature, for example by using hot water, and then may set in its inflated or distended shape under the lower temperatures of actual use. The conduits, however, must be flexible and distensible under at least some conditions to form the unit of the type shown in FIG. 1.

Ordinarily, the apparatus of the present invention will be used only with the small pressures produced by the hydraulic heads needed to cause flow. However, the invention is not limited thereto and a much higher positive pressure may be employed in some of the conduits from which ions are to be removed to obtain some of the results of ultra-filtration.

I claim:

1. A device for the continuous removal of dissolved ions from a liquid by electrodialysis which comprises,
   (a) an electrically insulated and impervious outer tube,
   (b) a plurality of conduits in the form of flexible tubes of smaller cross section than the outer tube,
   (c) each conduit comprising a continuous wall duct which is non-seletively permeable to water cations and anions, each duct having on at least one side, a very thin, non-self supporting layer of a cation permeable material and on at least one other side a similar very thin non-self supporting layer of anion permeable material,
   (d) the conduits arranged with walls having a very thin cation permeable membrane adjacent to each other and walls having very thin anion permeable membranes adjacent to each other,
   (e) the outer tube and the conduits being flexible and capable at least under some conditions, of distension, the conduits being for the flow of aqueous liquids therethrough, and
   (f) electrodes located at opposite ends of the cross section of the outer tube and extending substantially for the length of the tube, whereby when aqueous solutions of salts flow through the conduits and the electrodes are connected to a DC source the deionization of the water occurs in alternate conduits.

2. A device according to claim 1 in which the layers of cation and anion permeable material are joined at the edges and connect to each other along the conduits in the short dimension of the outer tube.

3. A device according to claim 1 in which the outer tube and the conduits are flexible and capable of being coiled into a compact space.

References Cited

UNITED STATES PATENTS

| | | | |
|---|---|---|---|
| 2,800,445 | 7/1957 | Clarke | 204—180 |
| 3,219,567 | 11/1965 | Lacey | 204—180 |
| 3,247,133 | 4/1966 | Chen | 260—2.1 |
| 3,318,796 | 5/1967 | Brown et al. | 204—301 |

JOHN H. MACK, *Primary Examiner.*

A. C. PRESCOTT, *Assistant Examiner.*